Sept. 27, 1932.  C. F. JENKINS  1,879,687
RESISTANCE CELL CIRCUIT
Filed Jan. 3, 1928
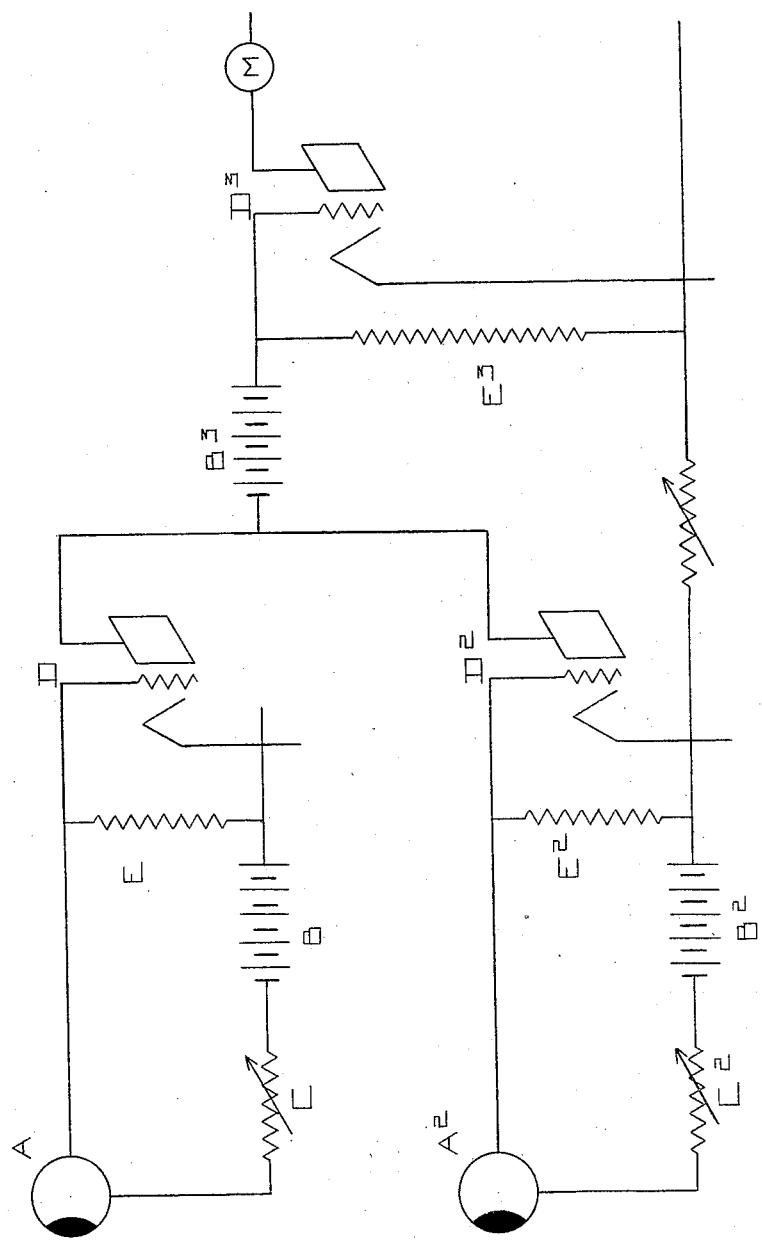
Inventor
C. Francis Jenkins.
Witness:
Sybil R. Almand.

Patented Sept. 27, 1932

1,879,687

UNITED STATES PATENT OFFICE

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION OF THE DISTRICT OF COLUMBIA

RESISTANCE CELL-CIRCUIT

Application filed January 3, 1928. Serial No. 244,324.

This invention relates to circuits in which light-sensitive cells of the alkali-metal type are used, and has for its principal object such a new combination of elements as will give a current output much greater than the usual "hook-up" for such cells.

In the consideration of the use of this type of cell the glow point of the cell must be taken into consideration, for the behavior of the cell is quite different from the resistance type of cell, selenium, for example.

The invention has for one of its principal objects to provide an improvement upon the light translating system disclosed in U. S. Patent 1,642,733 to C. F. Jenkins.

Another object of the invention is to provide a system of translating light impulses employing photo-electric cells having a spill-over characteristic, that is cells which have a maximum sensitivity at or near the spill-over point.

With the above, and other objects in view, the invention consists in the novel combination of elements shown in the drawing and particularly pointed out in the claims.

In the drawing A and A2 are light-sensitive cells; B, B2 and B3 batteries; C and C2 variable high impedance such as a resistance in the cell-battery circuits; D, D2 and D3 vacuum tubes; E, E2 and E3 grid leaks.

When light falls on cell A the output of tube D3 is read on its plate circuit meter, M. Resistance C is then adjusted until a maximum increase of current is shown on the meter which current is much greater than is possible (before the tube glows) than if no resistance is employed in the circuit.

To those skilled in the art it is well known that the current output of this type of cell increases very rapidly as the glow point is approached. But the cell is so very critical at this point that audible noises, tube noises, and other disturbances cause the cell to spill over and glow. It is, therefore, impossible to work with the voltage which will give the greatest possible output of the tube. The employment of the steadying ballast C does, however, permit just the result sought. In other words as the cell approaches its spill-over point the current rapidly increases. However, this increase of current causes a corresponding drop through the ballast resistances C, and effectually limits the ionizing potential or the effective working potential on the cells. The impedances C, therefore act actually as a steadying ballast and enable the cells to efficiently operate in the neighborhood of their spill-over point. This cannot be achieved by the resistances E and E2 which have been described as the grid leaks since these resistances must be fixed, the value of these resistances, as is well known in the art, being determined by the fixed characteristic of the associated tubes D and D2.

And as the output in any event is minute, i. e., rarely enough to give modulation values except under very special conditions, it is quite obvious that any gain per tube is extremely important.

It has also been found that, whereas working two or more cells off the same battery to feed into a common amplifier is difficult, if indeed it is not absolutely impossible, because of a reactance of one cell against the other when the cells are active, the introduction of a single tube in each circuit before the output is fed into a common amplifier, permits the addition of the output of each cell circuit without loss, probably due to the blocking action of the tubes themselves. Such an arrangement permits the addition of an indefinite number of cells feeding into a common amplifier.

What I claim, is—

1. The combination of an electron discharge tube and a series circuit comprising a light sensitive cell of the spill-over type, a battery, an adjustable ballast impedance and a fixed resistance, said series circuit being connected to the input circuit of said discharge tube with the said fixed resistance connected across the grid and cathode of said tube, said ballast impedance being adjusted to allow the cell to work in the neighborhood of its spill-over point, said impedance serving to match the impedance of the cell to that of the discharge tube, and for maintaining said cell operating in the neighborhood of its spill-over point.

2. The combination of an electron discharge device and a series circuit connected across the grid-cathode of said device, including a light sensitive cell of the spill-over type, a variable ballast impedance and a battery, and a fixed high resistance also connected across the grid-cathode of said device, said impedance being adjusted to enable said cell to work in the neighborhood of its spill-over point, said impedance serving to match the cell with the electron discharge device, and to maintain said cell operating in the region of its spill-over point.

3. A combination of a photo-electric cell having a spill-over characteristic, a battery, and an adjustable ballast impedance both in circuit with said cell, said impedance serving to maintain said cell operating in the region of its spill-over point.

4. The combination of a plurality of light sensitive cells of the spill-over type, a separate battery and a ballast impedance in series with each cell, an audion repeater for each cell having its grid and cathode connected in series with said cell, battery and impedance, a fixed leak resistance connected across the grid and cathode of each repeater, and a common audion into which both of said repeaters feed, each of said ballast impedances being adjusted to enable the associated cell to operate in the neighborhood of its spill-over point.

5. The combination of a plurality of light sensitive cells of the spill-over type, an audion repeater associated with each cell, a variable ballast impedance and a battery in series with each cell for enabling the cell to be operated in the region of its spill-over point, a common audion into which each of said repeaters feeds, and a fixed resistance connected across the grid-cathode of each audion.

In testimony whereof I have affixed my signature.

CHARLES FRANCIS JENKINS.